United States Patent
Gnech et al.

(10) Patent No.: US 7,480,805 B1
(45) Date of Patent: Jan. 20, 2009

(54) METHOD AND SYSTEM FOR IDENTIFYING AND PROCESSING AN UNAUTHORIZED ACCESS REQUEST

(75) Inventors: Thomas Hermann Gnech, Ammerbuch (DE); Regina Illner, Nufringen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/020,540

(22) Filed: Jan. 26, 2008

(51) Int. Cl.
*H04K 1/00* (2006.01)

(52) U.S. Cl. ............ 713/183; 713/182; 713/184; 726/26

(58) Field of Classification Search ............ 726/26; 713/182, 183, 184
See application file for complete search history.

(56) References Cited

U.S. PATENT DOCUMENTS

| | | | |
|---|---|---|---|
| 3,659,154 A | 4/1972 | Finn | |
| 4,259,664 A | 3/1981 | Boisclair | |
| 5,952,920 A | 9/1999 | Braddick | |
| 6,052,052 A | 4/2000 | Delmonaco | |
| 6,550,671 B1 | 4/2003 | Brown et al. | |
| 6,685,087 B2 * | 2/2004 | Brown et al. | 235/380 |
| 7,181,017 B1 * | 2/2007 | Nagel et al. | 380/282 |
| 2005/0022005 A1 * | 1/2005 | McKeeth | 713/200 |
| 2005/0081041 A1 * | 4/2005 | Hwang | 713/176 |
| 2005/0097441 A1 * | 5/2005 | Herbach et al. | 715/501.1 |
| 2006/0075230 A1 * | 4/2006 | Baird et al. | 713/168 |
| 2007/0250920 A1 * | 10/2007 | Lindsay | 726/7 |

* cited by examiner

*Primary Examiner*—Nasser Moazzami
*Assistant Examiner*—David Garcia Cervetti
(74) *Attorney, Agent, or Firm*—MaxValueIP, LLC

(57) ABSTRACT

The system reuses the classic User ID & Password combination for authentication and adds a third component called a USE code for additional authorization check, as an example. This method allows access to a system when it is requested with correct User ID and Password (i.e., with correct pass code) but with an unauthorized USE code, the system identifies it as an unauthorized access and triggers the proper security measures to minimize the damage and monitor the actions in a way not to alarm the unauthorized user who is using the owner's credential to access the system. The USE Code is an extension to the pass code to raise various alarms and have a stepwise access level control based on different inputted values.

1 Claim, 2 Drawing Sheets

METHOD AND SYSTEM FOR IDENTIFYING AND PROCESSING AN UNAUTHORIZED ACCESS REQUEST

BACKGROUND OF THE INVENTION

Usual secured system access is based on the requirement of two codes from the user, his/her username affected to a specific user account and a corresponding password or pass code. Both the username and the pass code define the two components of the system access data affected to a user account from that secured system. The access to the system is granted if the combination of username and pass code is valid irrespective of the situation how and/or who entered that access data.

System access data of usual pass code-secured systems are built from a 2-tuple of the components user accounts and pass code:

System access data$_{old}$=(user account, pass code)

There is no possibility to differentiate the use of system access data like avoiding a misuse of the user account once both components are disclosed.

After the disclosure of the valid system access data to the unauthorized person, misuse of the user account happens and security actions will not start until the owner is able to trigger them.

If it was a fake disclosure to avoid loss of property by providing an invalid user account/pass code combination, the owner (disclosing person) risks health, because the unauthorized user will find the access failure immediately and as a reaction the disclosing person may face immediate danger.

SUMMARY OF THE INVENTION

An example of this invention reuses the classic User ID & Password combination for authentication and adds a third component called a USE code for additional authorization check. This embodiment allows access to a system when it is requested with correct User ID and Password (i.e., with correct pass code) but with an unauthorized USE code, the system identifies it as an unauthorized access and triggers the proper security measures to minimize the damage and monitor the actions in a way not to alarm the unauthorized user who is using the owner's credential to access the system. The USE Code utilized by this invention could have different permutations. These permutations could limit access to some or part of the system that is being attempted to be accessed. For example, in case of Bank accounts, the USE Code can allow the daily limit withdrawals to be immediately decreased. In case of secure building, the USE Code can be used for access to certain areas but not all, and in case of vehicles, the USE Code can be used to access the inside of a vehicle but lock the engine.

DETAILED DESCRIPTION OF THE PREFERRED EMBODIMENTS

An example of this invention addresses the problem of user ID and password credential getting compromised by an unauthorized third party who is accessing the system either:

1) while the system is not aware of the compromise (i.e. giving full access based in the authorization of the owner), or
2) When the outright and total prevention of access (e.g., denying the access at the logon prompt) is not desired because it may alert the third party intruder.

It is proposed to affect a third component (use code) to the first two to allow differentiating a use mode of the two first components. In such a way, that it would be possible to extend the two valued component (authorized, unauthorized) to a variety of authorized use mode or cases.

Figure 1:
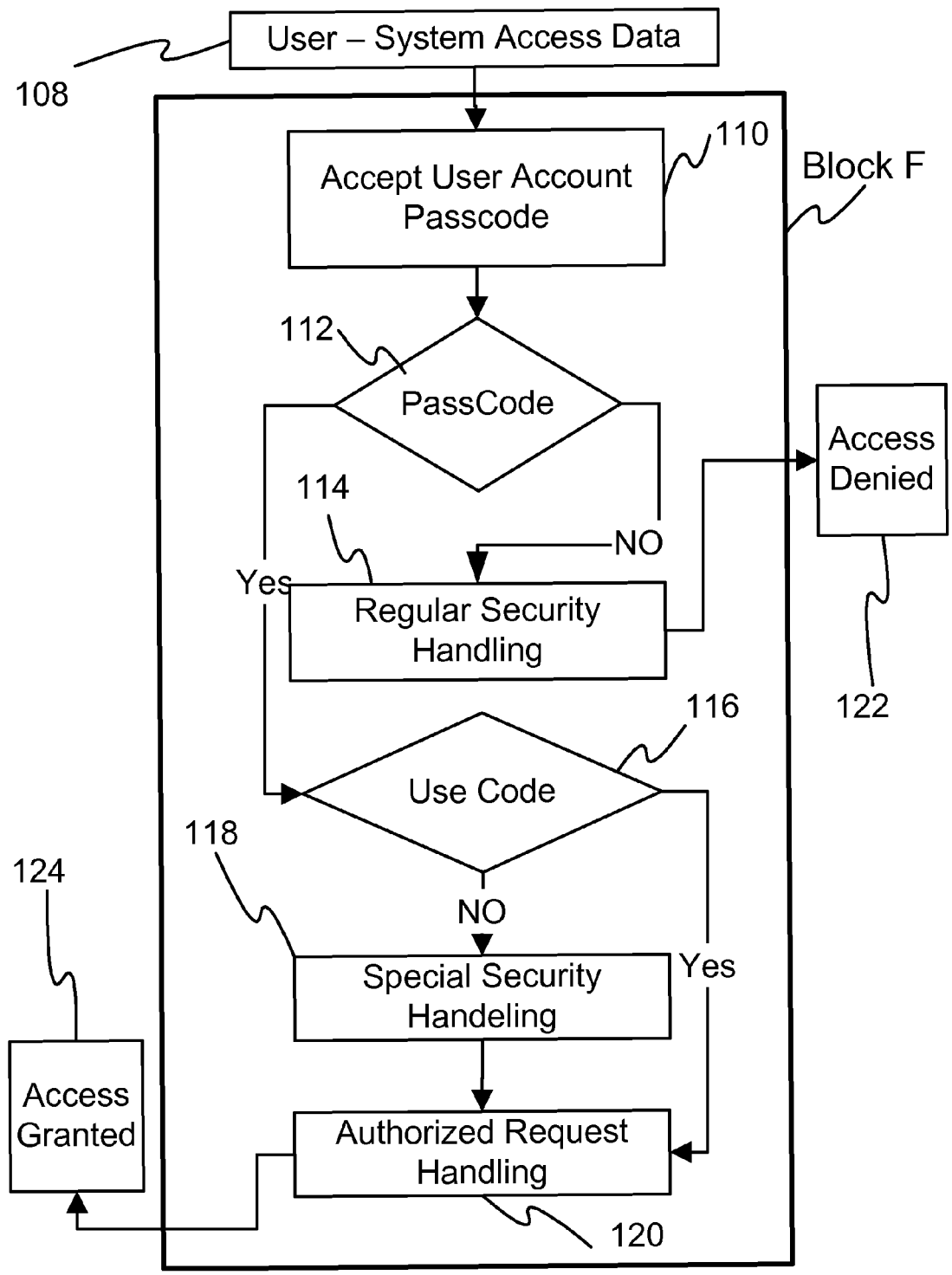
FIG. 1 is a schematic diagram of the system in its entirety
Figure 2:
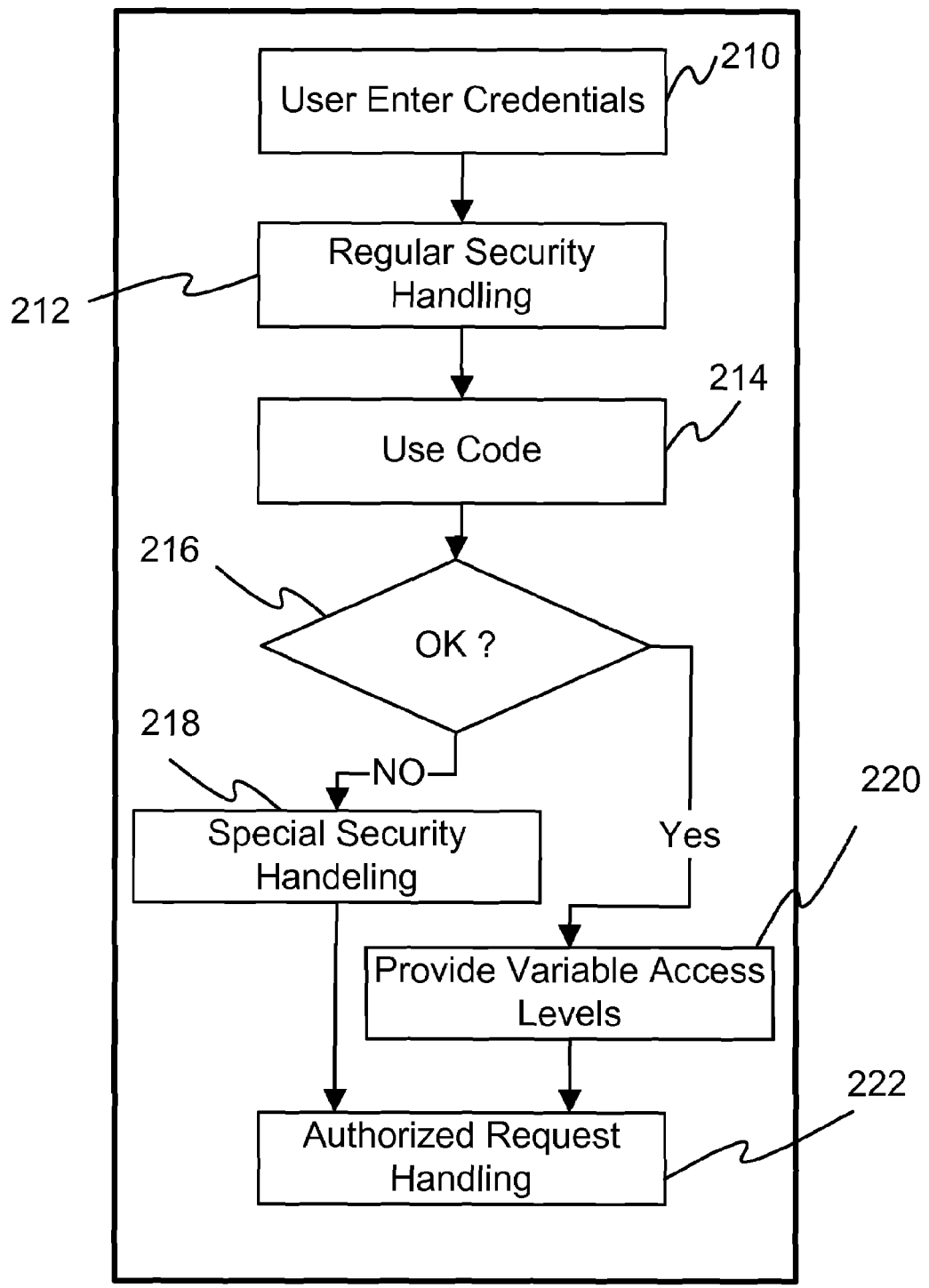
FIG. 2 is a schematic diagram of the Use Code and different levels of security that can be created by the Use Code

An example of this invention can be used for ATM machines, Bank accounts, Computer Systems Authorization, accessing secure buildings and in general any access that requires a username and a password as demonstrated by FIGS. 1 and 2.

System access data will be extended by adding one component, the use code, to the 2-tuple (user account, pass code) to build a 3-tuple consisting of the components user account, pass code and use code:

system access data$_{new}$=(user account, pass code, use code) (item 108, 110, 112)

The use code carries the information if access to the system is requested by an authorized user or by an unauthorized user. Automated action is triggered by the system depending on the use code value (e.g. special security handling, 114).

An example of this invention reuses the classic User ID & Password combination for authentication and adds a third component called a USE code for additional authorization check. (116) This embodiment allows access to a system when it is requested with correct User ID and Password (i.e., with correct passcode) but with an unauthorized USE code, the system identify it as an unauthorized access and triggers the proper security measures to minimize the damage and monitor the actions in a way not to alarm the unauthorized user who is using the owner's credential to access the system. (118, 120, 122, 124)

Beyond binary nature of authorized versus unauthorized, there could be other authorization levels associated with multiple USE codes that further tighten access to the applications or data for which the actual passcode owner is authorized to use. This helps in delegation scenarios where the user authorizes a third party to use his/her passcode to access the system while limiting the type of access based on the USE code. (210, 212, 214, 216, 218, 220, 222)

In one embodiment the system is A method for identifying and processing an unauthorized access request to a system, the method comprising the steps of:

An authentication module receiving a variable length access code and a corresponding user ID;

Wherein the variable length access code comprising a variable length password and a variable length use code;

starting from a first bit of information on the variable length access code, and scanning through the variable length access code, bit by bit, until a matching password is recognized using a hash function of the variable length password for the corresponding user ID, or until the last bit of the variable length access code is reached;

If the matching password is recognized, dividing the variable length access code into the variable length password and the variable length use code;

if the variable length access code is divided into the variable length password and the variable length use code, comparing the variable length use code with a list of all possible use codes;

in case of the variable length use code matching with a first entry in the list of all possible use codes, the authentication module allowing full access to the system;

in case of the variable length use code matching with a second entry in the list of all possible use codes, the system slowing down;

in case of the variable length use code matching with a third entry in the list of all possible use codes, the system becoming locked;

in case of the variable length use code matching with a fourth entry in the list of all possible use codes, the authentication module notifying authorities, security personnel, or police;

in case of the variable length use code matching with a fifth entry in the list of all possible use codes, the authentication module limiting the access to the system;

in case of the variable length use code matching with a sixth entry in the list of all possible use codes, the authentication module allowing full access to the system, and the authentication module notifying authorities, security personnel, or police;

in case of the variable length use code matching with a seventh entry in the list of all possible use codes, the authentication module allowing a limited access to the system, and the authentication module notifying authorities, security personnel, or police;

in case of the variable length use code matching with an eighth entry in the list of all possible use codes, the system malfunctioning;

in case of the variable length use code matching with a ninth entry in the list of all possible use codes, starting camera monitoring;

in case of the variable length use code matching with a tenth entry in the list of all possible use codes, the authentication module activating a silent alarm;

in case of the variable length use code matching with an eleventh entry in the list of all possible use codes, the authentication module simulating software corruption; and in case of the variable length use code matching with a twelfth entry in the list of all possible use codes, providing wrong or incomplete information to the user.

In the above embodiment, the system includes the following features:

Security front module gets user ID, password, and use code from the accessing user.

Security module examines the user ID and password to see if the combination authenticates to a valid account owner.

If not, the system performs a regular security handling for denying access when the user ID and password combination is invalid.

If yes, the USE code module examines whether the specified use code correspond to a valid authorized Use code corresponding to the owner's account.

If valid owner authorized Use code was specified, the system performs a regular security handling for when the account owner logon to the system, i.e. it provides the full authorization corresponding to the owner's account.

If valid authorized Use code with special meaning was specified, the system will modify and limit the system functionality based on the authorization level associated with the Use code to a predefined limited access privileges.

If an invalid authorized Use code was specified, the system invokes special security handling for the access.

Special security handling provides the same external behavior to the accessing user as it would to the account owner.

Special security handling triggers special security actions without notification to the accessing user.

Special security actions comprise of starting security monitoring sessions, constricting and further limiting user access, simulating system problems such as unavailable resources or computer virus problems, slowing the response time, and notifying the security personnel (in case of computer access)

Special security actions comprise of starting security monitoring e.g. transferring GPS position on a defined channel, simulating car problems such as engine failure or running out of fuel, slowing the response time, and notifying the security personnel (in case of automobile access)

Special security actions comprise of starting security monitoring sessions, transferring GPS position if any, constricting and further limiting user access to data, simulating system problems such as booting problem or power failure, slowing the response time, and notifying the security personnel (in case of mobile phone)

Special security actions comprise of starting security video monitoring and on-line camera monitoring, limiting amount of money transfer, simulating system problems such as ATM problem or power failure, slowing the response time, and notifying the security personnel (in case of bank account access)

In another embodiment the system can implement the Use Code in one letter found in the password identified by its location in the password; OR Separate Used code from password; OR having variable password length and appending the Use code to the password. The variable length makes it harder to guess the password, by the hackers. The system uses a loop/iterative function to examine and find/ match the password, bit by bit, starting from the first bit.

A system or apparatus that has some of the following items is an example of this invention: ATM machine, automatic bank teller, computer running the whole process and method described above, laptop, car, alarm, or mobile phone.

Any variations of the above teaching are also intended to be covered by this patent application.

The invention claimed is:

1. A method for identifying and processing an unauthorized access request to a system, said method comprising the steps of:

an authentication module receiving a variable length access code and a corresponding user ID;

wherein said variable length access code comprising a variable length password and a variable length use code;

starting from a first bit of information on said variable length access code, and scanning through said variable length access code, bit by bit, until a matching password is recognized using a hash function of said variable length password for said corresponding user ID, or until the last bit of said variable length access code is reached;

if said matching password is recognized, dividing said variable length access code into said variable length password and said variable length use code;

if said variable length access code is divided into said variable length password and said variable length use code, comparing said variable length use code with a list of all possible use codes;

in case of said variable length use code matching with a first entry in said list of all possible use codes, said authentication module allowing full access to said system;

in case of said variable length use code matching with a second entry in said list of all possible use codes, said system slowing down;

in case of said variable length use code matching with a third entry in said list of all possible use codes, said system becoming locked;

in case of said variable length use code matching with a fourth entry in said list of all possible use codes, said authentication module notifying authorities, security personnel, or police;

in case of said variable length use code matching with a fifth entry in said list of all possible use codes, said authentication module limiting the access to said system;

in case of said variable length use code matching with a sixth entry in said list of all possible use codes, said authentication module allowing full access to said system, and said authentication module notifying authorities, security personnel, or police;

in case of said variable length use code matching with a seventh entry in said list of all possible use codes, said authentication module allowing a limited access to said system, and said authentication module notifying authorities, security personnel, or police;

in case of said variable length use code matching with an eighth entry in said list of all possible use codes, said system malfunctioning;

in case of said variable length use code matching with a ninth entry in said list of all possible use codes, starting camera monitoring;

in case of said variable length use code matching with a tenth entry in said list of all possible use codes, said authentication module activating a silent alarm;

in case of said variable length use code matching with an eleventh entry in said list of all possible use codes, said authentication module simulating software corruption; and in case of said variable length use code matching with a twelfth entry in said list of all possible use codes, providing wrong or incomplete information to said user.

* * * * *